UNITED STATES PATENT OFFICE.

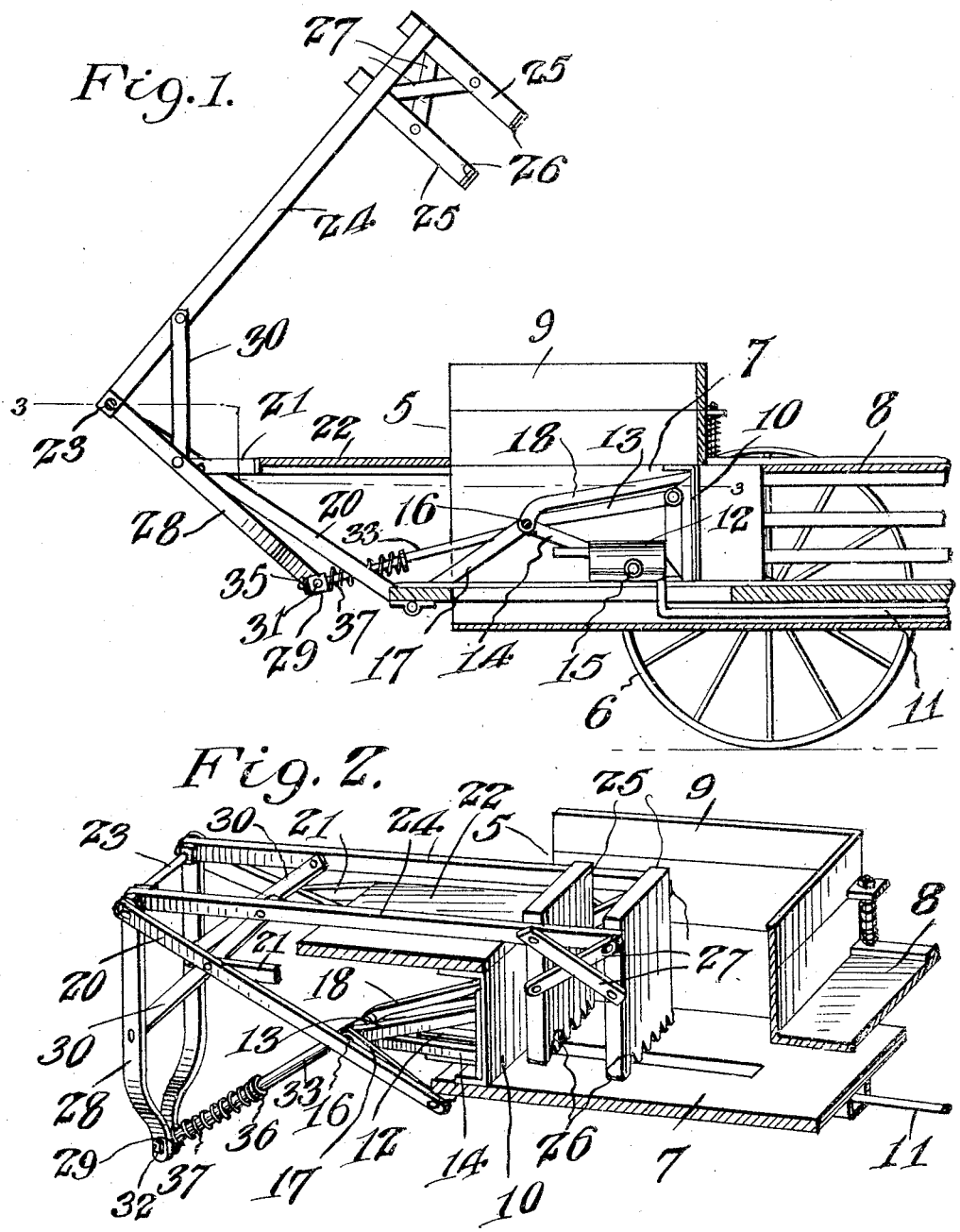

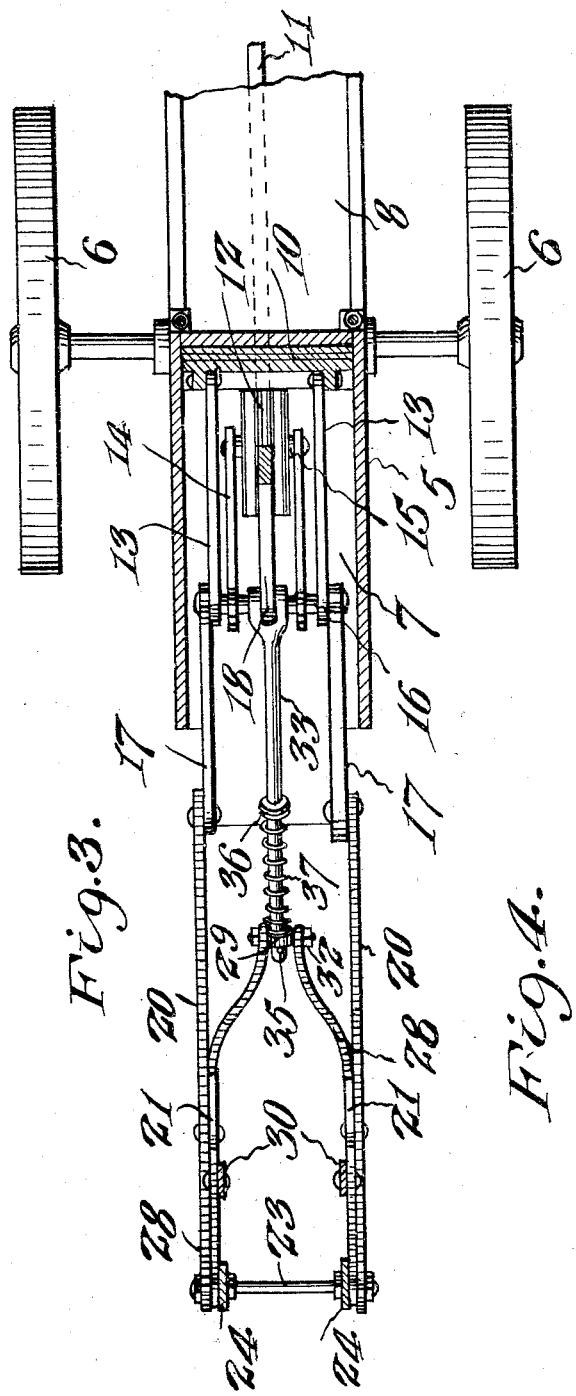

CHARLIE J. JOHNSON, OF OSSEO, WISCONSIN.

FEEDING DEVICE FOR BALING-PRESSES.

959,144.  Specification of Letters Patent. Patented May 24, 1910.

Application filed December 11, 1909. Serial No. 532,667.

*To all whom it may concern:*

Be it known that I, CHARLIE J. JOHNSON, a citizen of the United States, residing at Osseo, in the county of Trempealeau and State of Wisconsin, have invented certain new and useful Improvements in Feeding Devices for Baling-Presses, of which the following is a specification, reference being had to the accompanying drawings.

This invention relates to certain new and useful improvements in automatic feeders for baling presses and has for its object to provide a device of this character whereby the feeding member will be actuated by the reciprocation of the pressure head within the baling chamber to feed the material to be baled into the chamber.

Another object is to provide a very simple feeding attachment for baling presses of that character which are adapted to be operated by a suitable motor or horse power, whereby the baling operation will be materially facilitated and the output of the machine greatly increased.

A further object is to provide an oscillatory feeding member adapted to force the material into the baling chamber upon the reciprocation of the pressure head and to provide means for cushioning the descent of the feeding member, whereby the liability of derangement of the machine elements is obviated.

With these and other objects in view, the invention consists of the novel features of construction and the combination and arrangement of parts hereinafter fully described and claimed, and illustrated in the accompanying drawings, in which—

Figure 1 is a longitudinal section showing the feeding member in elevated position; Fig. 2 is a perspective view, partly in section, illustrating the position of the parts after the feeding member has descended; Fig. 3 is a horizontal section taken on the line 3—3 of Fig. 1; Fig. 4 is an enlarged detail section through the end of the pitman rod; and Fig. 5 is a detail perspective view of the pivoted collar disposed between the lower ends of the yoke bars.

Referring to the drawings 5 indicates the body of the machine which is mounted upon suitable wheels 6. The machine comprises the pressure chamber 7 and the bale receiving extension 8. A feed hopper 9 is disposed upon the top of the pressure chamber and is adapted to receive the hay, straw, or other material to be fed thereto. A reciprocatory pressure head 10 is disposed within the chamber 7 and is adapted to be operated through the medium of a longitudinally extending bar or rod 11 which is operatively connected to a suitable motor. The end of this rod may be connected to the pressure head in any desired manner, but as shown in the drawings, it would preferably be disposed within a suitable casing 12. Links 13 are secured to the opposite sides of the pressure head 10 and similar links 14 are mounted upon the transversely extending trunnions 15 formed upon the casing 12. These links are connected by the transverse pin 16. Also secured to the pin 16 at the opposite ends thereof are the links 17 the other ends of which are pivoted upon the ends of the side bars of the machine body. The pin 16 is rigidly supported by means of a longitudinally extending bar 18 which is secured to the reciprocating pressure head. The link 17 is adapted to oscillate as reciprocatory movement is imparted to the pressure head in the operation of the machine.

The foregoing elements comprise a machine of well known construction, and forms no part of the present invention. It is upon a machine of such construction that my improved feeding device is best adapted for application, though it will be understood that its use upon machines of other constructions to which it may be efficiently adapted is within the scope of my invention.

In applying my improved feeding attachment, I employ the diagonally extending supporting bars 20 which are secured to the brace bars 21 attached to the opposite sides of a longitudinally extending platform 22 carried upon the machine. A transverse rod 23 is rotatably mounted in the outer ends of the supporting bars 20. Rigidly secured upon the rod 23 adjacent to the supporting bars 20 are the longitudinally extending bars 24 which extend inwardly and are of sufficient length to project over the feed hopper of the baling chamber. Between the free ends of these bars 24 the depending presser blocks 25 are secured. These blocks are in the form of substantially rectangular boards the lower ends of which are serrated, as shown at 26. They are connected together and braced by means of the cross bars 27. Also rigidly secured upon the rotatable rod 23 are yoke bars 28 which are disposed between the ends of the longitudinal bars 24. The lower ends of these yoke bars are bent inwardly toward each other and receive between their extremities the collar 29. The yoke bars are braced and supported from the bars 24 by means of the diagonal bars 30. The collar 29 is formed with the transverse studs 31 which extend through the extremities of the yoke bars and are retained therein by means of suitable nuts 32. A rod 33 is longitudinally movable through an aperture 34 formed through the collar 29. A pin 35 projects from the opposite sides of said rod at its outer end to limit the outward movement of the collar thereon. A collar 36 is rigidly secured to the rod inwardly of the yoke bars and a spring 37 is disposed upon said rod between the collars 29 and 36. This spring is adapted to absorb the shock or vibration which would otherwise be imparted to the various links and bars in the operation of the machine. The inner end of the rod 33 is pivotally disposed upon the transverse pin 16.

In the operation of the machine, when the pressure head 10 is moved to the forward end of the baling chamber the hay, or straw, or other material being baled is thrown into the hopper by the operator. The various links when the pressure head is in this position are arranged, as shown in Fig. 1, the feeding member being disposed at an angle above the hopper. Upon the movement of the pressure head to the rear end of the baling chamber, it will be noted that the positions of the links 17 will be reversed or swung outwardly and rearwardly from the baling chamber. At the same time the rod 33 which is pivotally connected to the transverse pin 16 will be moved outwardly, whereupon the feeding member will be swung downwardly upon the pivot rod 23, the yoke bars being carried outwardly by the rod 33 to a vertical position. The outward movement of the yoke bars will also swing the rod 33 downwardly to the position shown in Fig. 2. Upon this movement of the yoke bars and the rod, the collar 29 will turn between the lower ends of the yoke bars and the spring 37 will assimilate the shock or vibration which would otherwise be imparted to the various links by the descent of the feeding member. When the presser members 25 descend into the feeding hopper, the material therein will be forced downwardly and into the baling chamber. When the movement of the pressure head is reversed and is drawn inwardly within the baling chamber, the material therein will be compactly pressed and forced into the bale receiving extension of the machine where it may be suitably wired or bound into bales. From the foregoing it will be seen that I have produced a feeding attachment for baling presses which is entirely automatic in its operation and eliminates a large amount of labor which has heretofore been required in the operation of machines of this character. The baling operation is also materially facilitated and a very large amount of work may be accomplished in a short time.

While I have shown and described what I believe to be the preferred embodiment of my invention, it will be obvious that numerous minor changes in the form, proportion and details of construction may be resorted to without departing from the essential features or sacrificing any of the advantages thereof.

Having thus described the invention what is claimed is:

1. In a baling machine, the combination of a reciprocatory pressure head arranged within the baling chamber, diagonally extending supporting bars secured to the frame of the machine and extending rearwardly thereof, an angular frame pivoted between the ends of said bars, said frame comprising longitudinally extending parallel bars, vertical bars extending below said longitudinal bars, spaced feeding blocks carried by said longitudinal bars, a rod movable with the pressure head and connected to the lower ends of the vertical bars, said rod being movably held between said bars, a collar on said rod, and a spring arranged between the collar and said bars, the reciprocation of the pressure head being adapted to swing the frame between said diagonal bars whereby the feeding blocks are caused to descend into the baling chamber to feed the material into the same, substantially as and for the purpose set forth.

2. In a baling machine, the combination of a reciprocatory pressure head disposed within a baling chamber, parallel diagonally extending bars secured to the frame of said machine, a transverse pivot rod mounted in the outer ends of said bars, a frame rigidly secured upon said rod, said frame consisting of parallel longitudinal bars and vertical depending yoke bars, diagonal braces connecting said bars, a collar pivoted between the lower ends of said bars, a rod pivotally connected to the pressure head movable through said collar, a pin secured in the outer end of said rod, a collar rigidly secured on said rod, a spring disposed between said collar and the collar between the yoke bars, and spaced depending feeding members secured between the inner ends of the longitudinal bars adapted to force the material into said baling chamber upon the reciprocation of said pressure head, substantially as and for the purpose set forth.

In testimony whereof I hereunto affix my signature in the presence of two witnesses.

CHARLIE J. JOHNSON.

Witnesses:
  G. O. LINDERMAN,
  G. I. THEW.